May 21, 1963  J. J. PASCIAK  3,090,537
LID FOR HOT DRINK CONTAINER
Filed March 13, 1961

INVENTOR.
Joseph J. Pasciak
BY
Salter + Michaelson
Attorneys.

United States Patent Office 3,090,537
Patented May 21, 1963

3,090,537
LID FOR HOT DRINK CONTAINER
Joseph J. Pasciak, Cumberland, R.I., assignor to Nyman Manufacturing Company, Providence, R.I., a corporation of Rhode Island
Filed Mar. 13, 1961, Ser. No. 95,323
1 Claim. (Cl. 229—1.5)

The present invention relates to a lid for a hot drink container. More particularly, the present invention relates to a container lid that has a reservoir formed therein for receiving spillage from the container and for draining the spillage back into the interior of the container.

In those establishments that sell hot drinks such as coffee or tea, it is customary to utilize a paperboard or plastic container for carry-out orders. In such instances, it is usually necessary to cover the container with a lid, and those lids known heretofore have generally consisted of a circular disc formed with a tab for removing the lid from the container top. Since the hot drink in the container generates steam, the lid must be provided with an aperture of some form to allow the steam to escape therethrough; otherwise the pressure resulting from the steam will force the lid from the container. When the hot liquid in the container is located at an elevation that is closely adjacent the lid, it is not unusual for the liquid to escape through the vent hole provided in the lid when the container is carried from one location to another. When this spillage occurred in the prior known containers, it remained on top of the lid; and care had to be taken to carefully remove the lid when the liquid was to be consumed. If the container was carried in stacked relation with other containers, such as is often the case, the spilled liquid would then saturate the lower edge of the container resting on the upper surface of the lid and would again necessitate care being taken to carefully place the container so that it would not mar the surface on which it was placed.

The lid for use on a hot drink container embodied in the present invention avoids the attendant difficulties experienced with the prior known lid constructions and includes a unique constructional arrangement that prevents spillage from collecting on the lid surface and further provides that if any spillage does occur, it will be returned to the interior of the container. The constructional arrangement of the lid for carrying out the intended purpose of the invention includes a reservoir that is located centrally of the lid body, the reservoir having a vent opening formed centrally thereof that communicates with the interior of the container on which the lid is positioned. Thus, if any spillage does occur due to jostling of the container, or if the container is too full, the excess liquid will be collected in the reservoir and will be prevented from overflowing onto the surface of the lid. The reservoir is constructed with a concave bottom wall so that the spillage entering therein will naturally drain downwardly through the vent opening and back into the interior of the container.

Accordingly, it is an object of the present invention to provide a lid for a hot drink container that includes a reservoir that is adapted to receive spillage from the container and to return the spillage to the interior of the container without the collection thereof on the surface of the lid.

Another object of the invention is to provide a lid for a hot drink container that is formed with a reservoir for receiving spillage from the container, the reservoir being elevated with respect to the peripheral edge of the lid so that the lowermost point of the reservoir is substantially coplanar with the lowermost point of the peripheral edge.

Still another object is to provide a reservoir in a lid for use on a hot drink container that includes a concave wall construction in the centermost point of which a vent opening is formed.

Still another object is to provide a reservoir construction for use on a hot drink container that has an annular beaded portion formed around the upper surface thereof, the annular beaded portion substantially increasing the vertical dimension of the reservoir so that spillage received therein from the container will be effectively retained therein for drainage back into the interior of the container.

Still another object is to provide a lid for use on a hot container that includes a centrally disposed reservoir that is elevated with respect to the peripheral edge of the lid and is interconnected to an annular inclined wall, the slope of which is substantially similar to the slope of the reservoir bottom wall.

Still another object is to provide a plastic lid for use with a hot drink container, a tab construction being joined to the outer peripheral edge of the plastic lid and being utilized to remove the plastic lid from the sealed position thereof on the container.

Other objects, features and advantages of the invention will become apparent as the description thereof proceeds when considered in connection with the accompanying illustrative drawings.

In the drawings which illustrate the best mode presently contemplated by me for carrying out the present invention:

Figure 1:
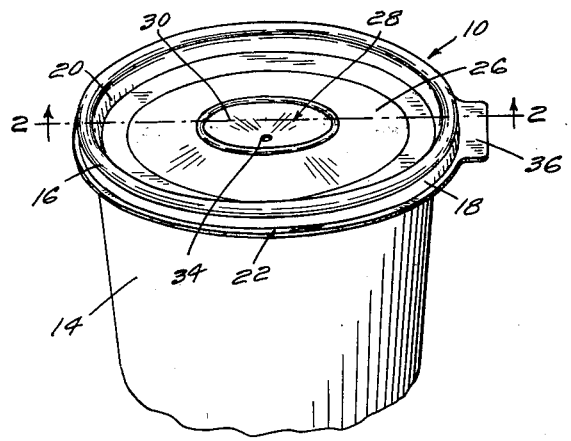
FIG. 1 is a perspective view of the upper portion of a container showing the lid embodied in the present invention secured to the upper lip of the container.
Figure 2:
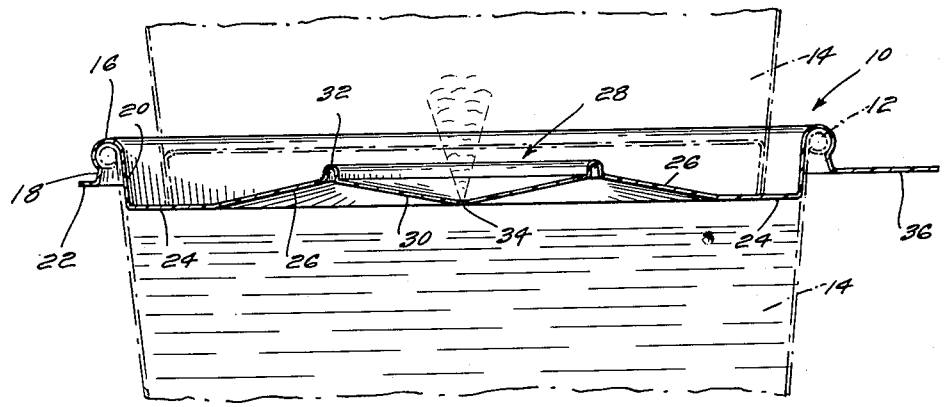
FIG. 2 is a sectional view taken along lines 2—2 in FIG. 1, the container on which the lid is mounted being shown in dotted lines, and a container located in stacked relation on the lid also being shown in dotted lines.
Figure 4:
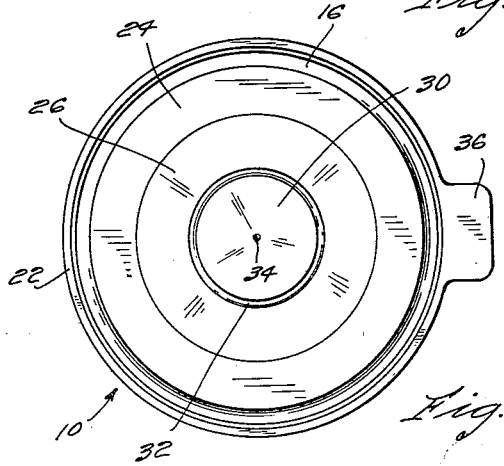
FIG. 4 is a bottom plan view of the lid embodied herein.

Referring now to the drawings and particularly FIGS. 1 and 2, the lid embodied in the present invention is generally indicated at 10 and as shown is adapted to be mounted or secured on the uppermost peripheral edge or lip 12 of a container 14. The material from which the lid 10 is constructed is preferably a thermoplastic material and is generally flexible in construction. It is understood, however, that other materials may be utilized, such as paperboard or lightweight metals, without departing from the spirit of the invention.

Referring again to FIG. 2, the lid 10 is shown including an outer peripheral edge 16 that is defined by an outer wall 18 and an inner wall 20 that are spaced from each other to form an annular groove for receiving the lip 12 of the container 14. Joined to the outer wall 18 of the peripheral edge 16 is a shortened flange 22 that is formed during the molding of the lid. Integrally joined to the inner wall 20 of the edge 16 is a wall construction that is defined by an annular, horizontally extending section 24, an annular, upwardly extending inclined section 26 and a reservoir generally indicated at 28.

The shortened horizontal section 24 extends for only a portion of the radius of the wall construction that defines the upper surface of the lid 10 and is adapted to receive the lower edge of a container that would be located on the lid in stacked relation such as shown in dotted lines in FIG. 2. The inclined section 26 which defines an intermediate portion of the wall construction extends upwardly with respect to the section 24 and the peripheral edge 16 and is interconnected to the reservoir 28 so as to elevate the reservoir 28 with respect to the peripheral edge, as will hereinafter be described. The reservoir 28 is circular in configuration when viewed in plan and includes a bottom wall 30 that is generally inclined to define a concave construction. The inclination of the reservoir bottom wall 30 is substantially the same slope as the inclined annular wall 26, the lowermost point of the reservoir thus being elevated so as to be substantially coplanar with respect to the horizontal section 24 and the lowermost edges of the peripheral edge 16.

Interconnecting the annular inclined wall 26 and the bottom wall 30 of the reservoir 28 is a raised or beaded portion 32 that defines the upper edge of the reservoir. The beaded edge 32 that is joined directly to the bottom wall 30 of the reservoir 28 acts to increase the vertical dimension of the reservoir, and as will be described hereinafter, is effective in retaining spillage from the container 14 within the reservoir 28.

In use of hot drink containers and lids therefor, it is necessary to provide an opening in the lid for venting purposes so that the steam resulting from the hot liquid contained in the container will be able to escape therefrom. In the lid 10 embodied in the present invention the opening for venting the container is formed in the reservoir 28 at the lowermost point of the bottom wall 30 as indicated at 34. By forming the opening 34 in this manner, the structural configuration of the reservoir may be generally defined as an inverted truncated cone, the opening 34 being located at the severed apex of the cone. The position of the vent opening 34 is thus located substantially coplanar with respect to the lowermost surface of the wall construction of the lid. Therefore, with the lid in position on the lip 12 of the container 14, the vent 34 will be displaced no lower than the lowermost portions of the lid. The lid construction is completed by a tab 36 that is joined to the outer wall 18 of the peripheral edge 16. The tab 36 is provided for removing the lid 10 from its position on the upper lip 12 of the container 14, and in those instances when the lid is sealed to the container 14 either by reason of the interlocking effect of the groove defined by the peripheral edge on the lip 12 or by reason of the interlocking relation of the materials from which the lid and container are formed, the tab 36 provides the only means for releasing the lid 10 from the sealed position thereof on the container 14. When the lid 10 is formed of a plastic material such as disclosed in the present invention, the tab 36 has been found to be indispensable in removing the lid 10 from the sealed position thereof on the container 14.

Figure 3:
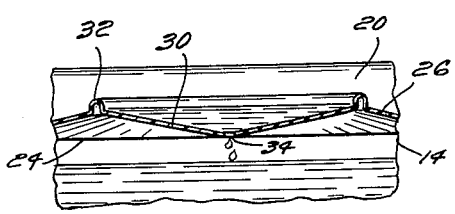
FIG. 3 is a partial sectional view similar to FIG. 3 showing the reservoir and the relationship thereof with respect to the level of the liquid in the container, the liquid being illustrated occupying the reservoir and draining therefrom into the interior of the container.

In use, the container 14 is normally filled to a level that is adjacent the upper edge or lip 12, and when the container is to be carried from one location to another, the lid 10 is applied to the lip 12 by inserting the annular peripheral edge 16 over the lip 12. With the lid 10 in position, the vent 34 is substantially coplanar with the lowermost surfaces of the lid and is thus removed from engagement with the liquid level as illustrated in FIG. 3. In the event that the container 14 is jostled in the carrying thereof, spillage of the liquid in the container may occur, in which event the liquid will flow through the vent opening 34 into the reservoir 28. Since the vertical dimension of the reservoir is of a sufficient height to effectively retain the spillage therein, the liquid will not collect on the upper surfaces of the wall construction of the lid. Furthermore, when the container 14 is repositioned so that the axis thereof is generally vertical, the spillage that had passed through the opening 34 into the reservoir 28 will gravitate downwardly on the bottom wall 30 of the reservoir and will then pass through the opening 34 back into the interior of the container, as illustrated in FIG. 3. As shown in FIG. 3, liquid has been collected in the reservoir 28 and is gravitating or passing downwardly through the opening 34 into the interior of the container. Since the reservoir 28 isolates the spillage from the remaining portions of the lid 10, a cup nested on the lid will be prevented from contacting the spilled liquid. It is to be noted that the annular beaded edge 32 that forms the upper edge of the reservoir 28 not only increases the vertical dimension of the reservoir, but also acts as a stiffening member therefor and in effect strengthens the lid so that engagement on the inclined wall 26 or on the reservoir 28 by the user's finger will not cause the wall 26 to be retained in a depressed position. Thus the strengthening action of the annular beaded edge 32 will cause the annular inclined wall 26 to return to the normal position thereof as illustrated in FIG. 2. To state this feature in another manner, it can be said that the lid will not set when depressed and the presence of the annular beaded edge 32 causes the wall construction of the lid to be sufficiently resilient to allow the surface to reform to the original position thereof if pressure has been applied thereto.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

What is claimed is:

In a hot drink container having a liquid receiving body portion that terminates at the uppermost end thereof in an annular beaded lip, a lid member for enclosing said body portion including a wall construction that is defined by an outer raised peripheral edge that forms an annular groove on the underside thereof for engaging the lip of the body portion when said lid member is inserted thereon, an intermediate annular horizontal portion joined to the lowermost edge of the inner wall of said raised peripheral edge, an annular inclined section joined to said horizontal portion and extending upwardly with respect thereto, and a central reservoir defined by a depressed central wall that is interconnected to said inclined section, the slope of said central wall being substantially similar to the slope of the inclined section, so that the lowermost point of said reservoir is substantially coplanar with said horizontal portion, said depressed central wall being resistant to internal pressures generated in said container, wherein said central wall constantly maintains the depressed position thereof when said lid is mounted on said container, the lowermost point of said reservoir having an opening formed therein that is adapted to relieve pressure in said container by venting gases therefrom and further providing for return of liquid spillage that had passed therethrough into said reservoir, the configuration of said reservoir causing the spillage to gravitate through said opening, said reservoir including an upper beaded portion that interconnects the upper edge of said inclined portion to the upper edge of the depressed central wall of said reservoir, said upper beaded portion elevating the height of the reservoir so as to prevent the spillage entering therein through said opening from overflowing onto the adjacent area of said wall construction and collecting thereon, and said reservoir being exposed at the upper end thereof when said lid is mounted on said container in the position of use thereof, so that said opening is always open for venting said gases and for draining said spillage.

References Cited in the file of this patent

UNITED STATES PATENTS

| 183,953 | McNabb | Oct. 31, 1876 |
| 2,027,137 | Yeomans | Jan. 7, 1936 |
| 2,115,340 | McCrosson | Apr. 26, 1938 |
| 2,375,266 | Wilson | May 8, 1945 |
| 2,723,072 | Sayford | Nov. 8, 1955 |